US011473257B2

(12) United States Patent
Jang et al.

(10) Patent No.: US 11,473,257 B2
(45) Date of Patent: Oct. 18, 2022

(54) FOG REMOVAL APPARATUS AND MULTIPURPOSE FOG REMOVAL SYSTEM INCLUDING THE SAME

(71) Applicant: Hyun Sil Jang, Ansan-si (KR)

(72) Inventors: Hyun Sil Jang, Ansan-si (KR); Sun Hwan Choi, Ansan-si (KR)

(73) Assignee: Hyun Sil Jang, Ansan-si (KR)

(*) Notice: Subject to any disclaimer, the term of this patent is extended or adjusted under 35 U.S.C. 154(b) by 402 days.

(21) Appl. No.: 16/604,564

(22) PCT Filed: Apr. 27, 2017

(86) PCT No.: PCT/KR2017/004516
§ 371 (c)(1),
(2) Date: Oct. 10, 2019

(87) PCT Pub. No.: WO2018/190455
PCT Pub. Date: Oct. 18, 2018

(65) Prior Publication Data
US 2021/0285173 A1    Sep. 16, 2021

(30) Foreign Application Priority Data
Apr. 12, 2017    (KR) .................. 10-2017-0047614

(51) Int. Cl.
*E01H 13/00*    (2006.01)
*B01D 46/00*    (2022.01)
(Continued)

(52) U.S. Cl.
CPC .......... *E01H 13/00* (2013.01); *B01D 46/0005* (2013.01); *B01D 46/0036* (2013.01);
(Continued)

(58) Field of Classification Search
CPC ....... E01H 13/00; E03B 3/28; B01D 46/0005; B01D 46/0023; B01D 46/0036;
(Continued)

(56) References Cited

U.S. PATENT DOCUMENTS

| 2003/0145729 A1* | 8/2003 | Klemic ............... B01D 53/261 95/148 |
| 2010/0170499 A1* | 7/2010 | Bar ..................... B01D 53/261 126/635 |

FOREIGN PATENT DOCUMENTS

| JP | H07-109717 A | 4/1995 |
| JP | 2013-091966 A | 5/2013 |

(Continued)

OTHER PUBLICATIONS

KR20170039867A_ENG (Espacenet machine translation of Jang) (Year: 2017).*

(Continued)

*Primary Examiner* — Gabriel E Gitman
(74) *Attorney, Agent, or Firm* — Korus Patent, LLC; Seong Il Jeong

(57) ABSTRACT

The fog removal apparatus comprises a plurality of fog barriers for removing moisture in the fog by absorbing moisture in the fog and by allowing air to pass therethrough when the fog passes through the fog barrier on the wind, and a fog barrier support for supporting the fog barrier. The fog barrier comprises a perforated plate arranged on an outer surface of the frame to support the fog barrier; a coated mesh having a porous waterproofing function; a super absorbent sheet for absorbing a large amount of moisture from the fog passing through the fog barrier; a heating means arranged adjacent to the super absorbent sheet to heat and dry the coated mesh and the super absorbent sheet.

20 Claims, 9 Drawing Sheets

(51) Int. Cl.
  B01D 46/10 (2006.01)
  B01D 46/46 (2006.01)
  B01D 53/04 (2006.01)
  B01D 53/26 (2006.01)
  B01D 53/28 (2006.01)
  B01D 46/62 (2022.01)
  B01D 46/84 (2022.01)

(52) U.S. Cl.
  CPC ............. B01D 46/10 (2013.01); B01D 46/46 (2013.01); B01D 46/62 (2022.01); B01D 46/84 (2022.01); B01D 53/0438 (2013.01); B01D 53/0454 (2013.01); B01D 53/261 (2013.01); B01D 53/28 (2013.01); *B01D 2253/202* (2013.01); *B01D 2257/80* (2013.01); *B01D 2259/40088* (2013.01); *B01D 2279/40* (2013.01)

(58) Field of Classification Search
  CPC .... B01D 46/0063; B01D 46/10; B01D 46/46; B01D 53/0438; B01D 53/0454; B01D 53/261; B01D 53/28; B01D 2253/202; B01D 2257/80; B01D 2259/40088; B01D 2279/40
  See application file for complete search history.

(56) References Cited

FOREIGN PATENT DOCUMENTS

| KR | 10-2003-0062039 | A | | 7/2003 | |
|---|---|---|---|---|---|
| KR | 10-0495712 | B1 | | 6/2005 | |
| KR | 10-0838828 | B1 | | 6/2008 | |
| KR | 20080102548 | A | * | 11/2008 | ............. E01H 13/00 |
| KR | 10-0912798 | B1 | | 8/2009 | |
| KR | 10-2014-0012205 | A | | 1/2014 | |
| KR | 101369389 | B1 | * | 3/2014 | ........... B01D 5/0042 |
| KR | 10-2014-0110647 | A | | 9/2014 | |
| KR | 10-2016-0116132 | A | | 10/2016 | |
| KR | 20170039867 | A | * | 4/2017 | ............. E01H 13/00 |
| WO | 2012/105771 | A2 | | 8/2012 | |

OTHER PUBLICATIONS

KR20080102548A_ENG (Espacenet machine translation of Min) (Year: 2008).*

KR101369389B1_ENG (Espacenet machine translation of Che) (Year: 2014).*

\* cited by examiner

FOG REMOVAL APPARATUS AND MULTIPURPOSE FOG REMOVAL SYSTEM INCLUDING THE SAME

TECHNICAL FIELD

The present invention relates to a fog removal apparatus suitable for installation in an area where fog occurs regularly, for example, on bridges over rivers and streams, roads in mountainous areas, and the like. More specifically, the present invention relates to a fog removal apparatus comprising a plurality of fog barriers which absorb moisture from fog and pass dry air therethrough.

Also, the present invention relates to a multipurpose fog removal system comprising a fog removal apparatus suitable for installation in a habitually fog generating region, and further comprising an overflow prevention apparatus which is arranged at the top of the fog barrier support so as to provide an upward flow of air to prevent a fog overflow phenomenon that the fog rides over the fog barrier above.

In addition, the present invention relates to a multipurpose fog removal system comprising a fog removal apparatus suitable for installation in a fog region, and having a windshield function for preventing or minimizing damages to a facility or a driving cars and the like caused by strong winds in a windy environment.

Furthermore, the present invention relates to a multipurpose fog removal system comprising a fog removal apparatus suitable for installation in a fog area, and being remotely controlled automatically, either manually or via wired or wireless communication based on measurement signals and data such as temperature, humidity, wind direction/velocity, and so on.

BACKGROUND ART

Generally, it is difficult for a driver of a vehicle running on a road to secure a field of view due to fog, and in particular, a vehicle traveling at high velocity cannot maintain a safe distance due to fog, thereby causing a big traffic accident. Furthermore, it is more difficult to obtain visibility due to fog in harsh fog environments, such as in bridges installed over rivers or streams, or such as on roads in environments such as mountains and coastal highlands.

According to the traffic accident rate (Statistics of Road Traffic Authority from 2011 to 2013) by weather conditions, the mortality rate of traffic accidents caused by fog was 10.6 deaths per 100 cases, which is about 2 to 4 times more than clear days, cloudy days, or rainy days. Also, on the foggy day, the incidence of collision accidents was 27.6%, which was 1.3 times higher than on the clear day (20.8%). Therefore, the elimination or reduction of fog which occurs regularly is a necessary condition to prevent and reduce the traffic accidents of vehicles running at high velocity.

On the other hand, in the case of a harsh environment where fog occurs regularly, for example, in the case of bridges installed on the sea, coast roads or mountainous roads in highlands, strong winds due to geographical characteristics as well as fog may lead to greater risk of accident to the drivers of vehicles traveling at high speeds. It is therefore needless to say that there is a need to protect the driver, the vehicle or the facilities on the road by means of a system for eliminating or reducing fog, accompanied by means for coping with strong winds due to geographical characteristics.

With respect to the various problems described above, the prior art apparatus or method for removing or eliminating fog in a foggy environment are generally methods of lowering the relative humidity or shutting off the outside air.

First, as disclosed in Japanese Patent Laid-Open Publication No. 07-109717 (Apr. 25, 1995), a fog removal method and apparatus in which fog dissipation nets in the form of inertial separation type filter and a fog is forcibly fed by a blower from one side of the wall to the other side are disclosed. In such a fog removing method, a blowing means for forming a forced air flow for introducing a separate fog is necessarily required, which requires a considerable power consumption. Moreover, although the effect of removing fog can be achieved to some extent in a certain time in this manner, there is a problem that a large amount of fog can cause adverse effects by causing the phenomenon of overflow that rides through the fog dissipation net, over time. This is a common phenomenon occurring in most fog dissipation net type fog removal systems.

Next, according to the fog removal system of the fog dissipation net type issued in the Korean Patent Publication No. 10-083828 (Jun. 17, 2008), the synthetic resin fiber is made of a synthetic resin net, and the far infrared ceramic powder is liquefied and fused to the surface of the synthetic resin net, so called fog dissipation net. Also, in accordance with Japanese Patent Laid-Open Publication No. 2013-91966 (May 16, 2013), a fogging net system in which fog is dispersed by a plurality of cohesive webs constituted by irradiating a far infrared ray lamp to a net of a cohesive net has been proposed. Although the fog removal system of this kind is far superior to the conventional fog net removal method, it is vulnerable to the external environment in which the fog removing system is installed, which causes fundamental problems such as de-formation and breakage. In addition, above-mentioned fog removal systems of the fog dissipation net type or the fog eliminating net type has the drawback that the effect of the blocking network is remarkably reduced after a certain time due to the occurrence of the water film phenomenon on the surface of the fog protection net.

In order to solve the problem of the above-mentioned fog removal net method, the fog dissipating apparatus disclosed in International Patent Publication WO 2012/105771 (Aug. 9, 2012) and Korean Patent Publication No. 10-2014-0012205 (Jan. 29, 2014) has been proposed. Such a fog dissipating apparatus is a method of removing fog by evaporation or sedimentation using dry air. The fog dissipating apparatus may be effective for some installations, but it has limitations in eliminating the overall fog of the road, and in particular, there is a great obstacle to generalization of high-priced installation costs, electricity consumption, and maintenance costs.

According to the conventional fog removing method, it is difficult to collect only the fog by heating the air to lower the relative humidity. Therefore, there is a fundamental problem that the entire air including the fog must be heated. Further, since the moving velocity of the fog changes according to the wind velocity, it is practically difficult to heat the entire air according to the change of the velocity of the fog.

Apart from this, the fog removal apparatus installed in the area where the fog occurs frequently is very vulnerable to the strong wind-blowing environment. When the wind is blowing, the fog removal apparatus has a problem of direct or indirect influence to the vehicle traveling due to a strong wind pressure. This is a common problem of external facilities including fog barriers. Basically, it is necessary to solve the problem that such facilities must be installed so as to be able to withstand harsh external environment as well as to perform respective functions.

Korean Patent Laid-Open Publication No. 10-2003-0062039 (Jul. 23, 2003) and Korean Patent Publication No. 10-0495712 (Jun. 8, 2005)) disclose a soundproof wall having a windshield structure using a compression spring or an elastic spring. The soundproofing walls of these windshield structures are very difficult to apply, and in particular, the manufacturing process is very difficult due to the complicated structure of the spring, and it is difficult to realize the original function structurally when installed in a poor environment of the outside. Particularly, in an environment where a plurality of structures together such as a soundproof wall or a fog barrier are built together, it is necessary that the structure is stable and durable enough to withstand the external environment.

DISCLOSURE OF INVENTION

Technical Problem

It is an object of the present invention to provide a fog removal apparatus including a fog barrier which can easily and quickly remove fog.

Another object of the present invention is to provide a fog removal apparatus having a simple configuration which does not require a driving device of the prior art or a separate additional device used for heating air, and once installed, reduces maintenance and maintenance costs.

It is another object of the present invention to provide a multipurpose fog removal system configured to prevent overflow phenomena that the fog rides over the fog barrier above.

Another object of the present invention is to provide a multipurpose fog removal system having a windshield structure that is rotatably operated to tilt the fog barrier about a rotation axis when wind pressure is applied, It is still another object of the present invention to provide a multipurpose fog removal system that can be automatically controlled based on fog sensing means and measurement signals and data such as temperature, humidity, wind velocity, and wind direction, etc.

Solution to Problem

According to a preferred aspect of the present invention, there is provided a fog removal apparatus installed in a fog area, comprising a plurality of fog barriers for removing moisture in the fog by absorbing moisture in the fog and by allowing air to pass therethrough when the fog passes through the fog barrier on the wind, and a fog barrier support for supporting the fog barrier, the fog barrier support is connected to a frame surrounding the exterior of each of the fog barrier, characterized in that: wherein the plurality of fog barriers consist of the horizontal×vertical array including one or more fog barriers in horizontal and vertical directions; wherein each of the fog barrier comprising: a perforated plate having a plurality holes formed in an arbitrary shape, and arranged on one or both outer surfaces of the frame to support the fog barrier; a coated mesh having a porous waterproofing function that passes relatively small particles than fog but does not pass relatively large particles than fog; a super absorbent sheet for absorbing a large amount of moisture from the fog passing through the fog barrier; and a heating means arranged in the interior of the fog barrier adjacent to the super absorbent sheet to heat and dry the coated mesh and the super absorbent sheet; wherein the perforated plate, the coated mesh, the heating means, and the super absorbent sheet are spaced apart from each other at a predetermined distance from the one side of fog inflow to the opposite side of fog discharge in each of the frame of the fog barriers.

According to a preferred embodiment of the present invention, the super absorbent sheet comprises a plurality of holes punctured in any shape. More preferably, the super absorbent sheet may comprise a plurality of holes arranged at regular intervals in a circular pattern. As a result, a large amount of dehumidified dry air can be efficiently discharged to the road through the super absorbent sheet of the fog barrier.

According to a preferred embodiment of the present invention, super absorbent sheets are arranged in two rows within a frame of the fog barrier, and heating means are arranged between two rows of super absorbent sheets. Accordingly, in the fog removing apparatus according to the present invention, the efficiency of absorbing a large amount of moisture from the fog can be increased.

According to another aspect of the present invention, there is provided a multipurpose fog removal system comprising a fog removal apparatus installed in a fog area, characterized in that further comprising: an overflow prevention apparatus arranged at the upper end of the fog barrier support so as to provide an upward flow of air to prevent overflow phenomenon that the fog rides over the fog barrier above; and an wind prevention apparatus configured to tilt and rotate in one direction the plurality of fog barriers to a predetermined angle to a direction in which the fog is discharged from a direction in which the fog is introduced about the rotation axis of the frame coupled with the fog barrier support.

According to the multipurpose fog removal system according to another aspect of the present invention, fogs which ride over the fog barrier above is prevented from flowing into the road by the upward air flow heated at the upper end of the fog barrier, is mixed with the heated hot air, and flowed upward to the opposite side of the road. In con-sequence, the fog shielding net is preferably formed on the upper part of the road. Accordingly, it is possible to effectively prevent the overflow phenomenon that the fog rides over the fog barrier.

Meanwhile, in an environment where a strong wind is blowing on the road, fog generating conditions are not formed, so that the fog disappears naturally. On the other hand, strong winds can damage equipment installed on the roads, such as fog removal devices, which can also cause damage to high-speed vehicles on the road.

The multipurpose fog removal system according to another preferred aspect of the present invention comprises a wind prevention apparatus that prevents the strong external wind pressure from damaging the fog removal apparatus or affecting the running vehicle due to the fact that fog removal apparatus is fixed vertically. Preferably, the fog barrier of the fog removal apparatus can rotated to be tilted about the axis of rotation of the frame of the fog barrier by the wind prevention apparatus in order to withstand the strong wind pressure. In this way, the fog barrier of this invention is designed to be rotated so as to be tilted to a predetermined angle automatically according to the strong wind pressure by the wind prevention apparatus, and is configured to be returned to the original fixed position when the wind is weakened and the wind pressure weakens.

According to still another aspect of the present invention, a multipurpose fog removal system further comprises an automatic control panel configured to receive, respectively, a fog sensing signal, an image output signal, and an wind direction/velocity signals provided from a fog sensing device, CCTV, and a wind sensing device, and configured to receive, respectively, temperature/humidity signals provided from temperature/humidity measurement sensors and a tilt signal of the fog barrier provided from a position sensor for sensing the tilt of the fog barrier. Preferably, the automatic control panel includes programmable logic controller (PLC) and a communication card for Ethernet communication.

Preferably, the various signals and data received by the automatic control panel are provided to a portable terminal of an operator outside the central control regulating station via wireless communication. As a result, heating means for heating and drying the coated mesh and the super absorbent sheet, the overflow prevention apparatus, and the wind prevention apparatus of the multipurpose fog removal system according to the present invention can be controlled remotely and wireless.

Advantageous Effects of Invention

According to one aspect of the present invention, there is provided with a fog removal apparatus which absorbs moisture contained in the fog when the fog passes through the fog barrier due to a naturally occurring air stream, and is capable of completely removing or at least largely reducing the fog only by the configuration of the fog barrier itself, without any separate air inlet or drive means for removing fog.

In addition, there is provided with a multipurpose fog removal system according to another aspect of the present invention in which the overflow prevention apparatus installed on the upper part of the fog barrier prevents the overflow phenomenon that the fog crosses over the fog barrier, when a large amount of fog is continuously introduced.

Also, according to this invention, a multipurpose fog removal system with windshield structure capable of withstanding external strong wind pressure generated during strong winds and preventing accidents due to strong winds of a running vehicle is provided.

Further, according to the still another aspect of present invention, it is possible to control the multipurpose fog removal system manually, automatically or remotely via wired or wireless communication, based on various signals and data provided from measurement devices or sensors which are installed on the road or inside the fog removal apparatus.

BEST MODE FOR CARRYING OUT THE INVENTION

Hereinafter, embodiments of a fog removal apparatus and a multipurpose fog removal system according to the present invention will be described in detail with reference to the accompanying drawings.

Figure 1:
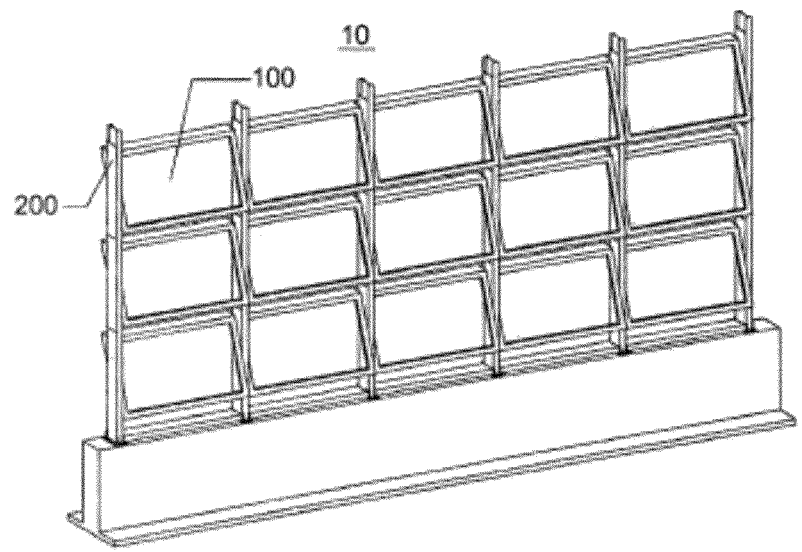
FIG. 1 is a perspective view schematically showing a fog removal apparatus according to the present invention.

Referring to FIG. 1, the fog removal apparatus 10 comprises a plurality of fog barriers 100 arranged in a horizontal×vertical array including one or more fog barriers 100 in horizontal×vertical directions, respectively, and a fog barrier support 200 to which a plurality of fog barriers 100 are fixed. The fog barrier support 200 is an H-beam typically used in a sound barrier or a windproof barrier installed on a road, and must be chosen to have a dimension and strength that is structurally capable of supporting a plurality of fog barriers 100.

Figure 2:
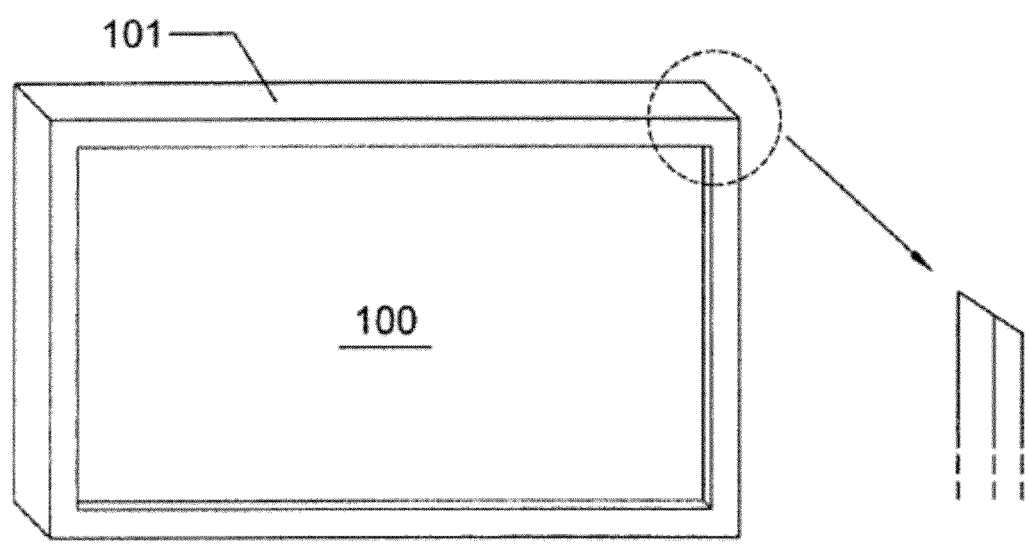
FIG. 2 is a perspective view schematically illustrating a frame of the fog barrier constituting the fog removal apparatus shown in FIG. 1.

Each fog barrier 100 is structured such that the outside thereof is surrounded by a frame 101 as well shown in FIG. 2.

Figure 3:
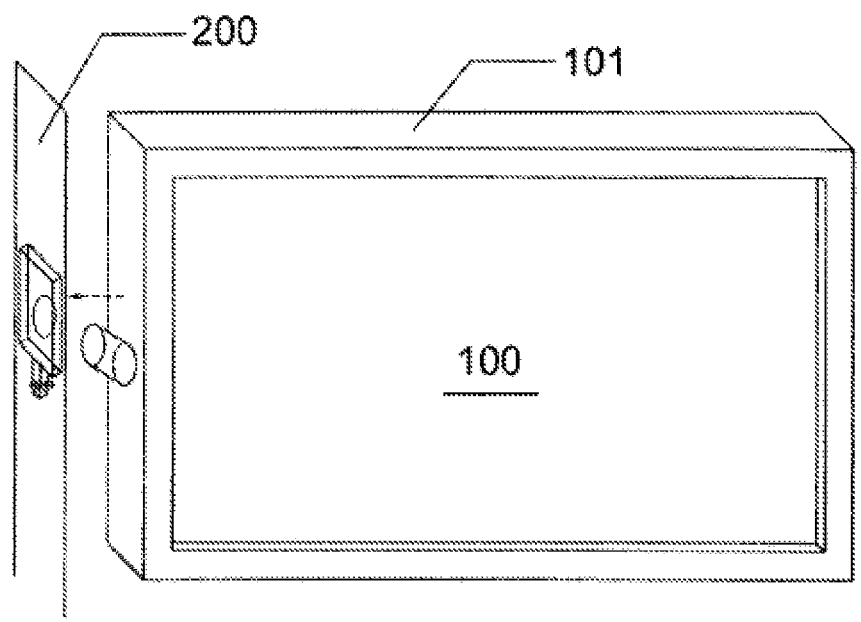
FIG. 3 is a perspective view schematically showing a connection structure for installing the frame shown in FIG. 2 to a fog barrier support.

Both ends of the frame 101 of the fog barrier 100 are rotatably connected to the fog barrier support 200 supporting the fog barrier 100. For example, referring to FIG. 3, a cylindrical protrusion is provided on a side surface of the frame 101 of the fog 100, and the protrusion is connected to a connection mechanism attached to the fog barrier support 200. More specifically, cylindrical protrusions respectively provided at both sides of the frame 101 are inserted through the cylindrical holes respectively formed in both sides of the fog barrier support 200. The connection structure of the frame 101 and the fog barrier support 200 shown in FIG. 3 is exemplary, and the connection structure is not limited thereto. For example, unlike the connection structure shown in FIG. 3, it is possible to form cylindrical holes on both sides of the fog barrier support 200 so as to directly insert cylindrical protrusions of the wall frame 101 into the fog barrier support 200, without the separate connecting mechanism having the cylindrical hole. Conversely, another connection structure may be used in which a cylindrical hole is formed in the frame 101 of the fog barrier 100 and a cylindrical protrusion is formed in the fog barrier support 200 so as to be inserted into the cylindrical hole of the frame 101. Such a rotatable connection structure can be changed or modified at any manner.

As best shown in an enlarged side view of the circular portion indicated by a dotted line of FIG. 2, upper and lower surfaces of the frame 101 of the fog barrier 100 are formed to be inclined at an oblique angle, respectively. As will be described later in detail with reference to FIGS. 8 to 12, It is to smoothly operate two fog barriers 100 arranged up and down without being in contact with each other when two fog barriers 100 are rotated in a tilting manner about the rotation axis of the frame 101.

According to a preferred embodiment of the present invention, the fog removal apparatus 10 may be composed of several blocks and one block has a 2×3 or 3×2 array including a plurality of fog barriers 100 in horizontal and vertical directions, respectively. In this connection, several blocks of the fog barrier 100 are connected to each other in a horizontal direction as shown in FIG. 1. Therefore, the fog removing apparatus 10 including several blocks can be installed at an appropriate length on both sides of the road, as needed in a region where fog occurs regularly, for example, over 500 m, 1 km, or 2 km, etc. The height of the fog barrier 100 installed on roads is preferably 2 m to 10 m, which can be adjusted to any higher or lower height depending on the climatic characteristics, traffic volume, and so on, of the installation site.

The shape and size of the frame 101 of the fog barrier 100 may be appropriately selected in consideration of the weight of each fog barrier 100. In one preferred embodiment, the frame 101 is formed in a rectangular shape. Preferably, the size of the frame 101 is 2.0 m to 4.0 m in horizontal length and 0.5 m to 1.0 m in vertical height, more preferably 1.5 m in length and 1.0 m in height.

Alternatively, an array of a plurality of fog barriers 100 constituting one block of the fog removal apparatus 10 may be arranged as a 3×3, 4×1, 1×4 array, or any other array. Also, the frame 101 of the fog barrier 100 may be formed in a square other than a rectangular shape or any other shape. Accordingly, it goes without saying that the array and size of the fog barrier or the shape and size of the frame of the fog barrier may be arbitrarily changed or modified within the scope including the concept of the present invention.

Figure 4:
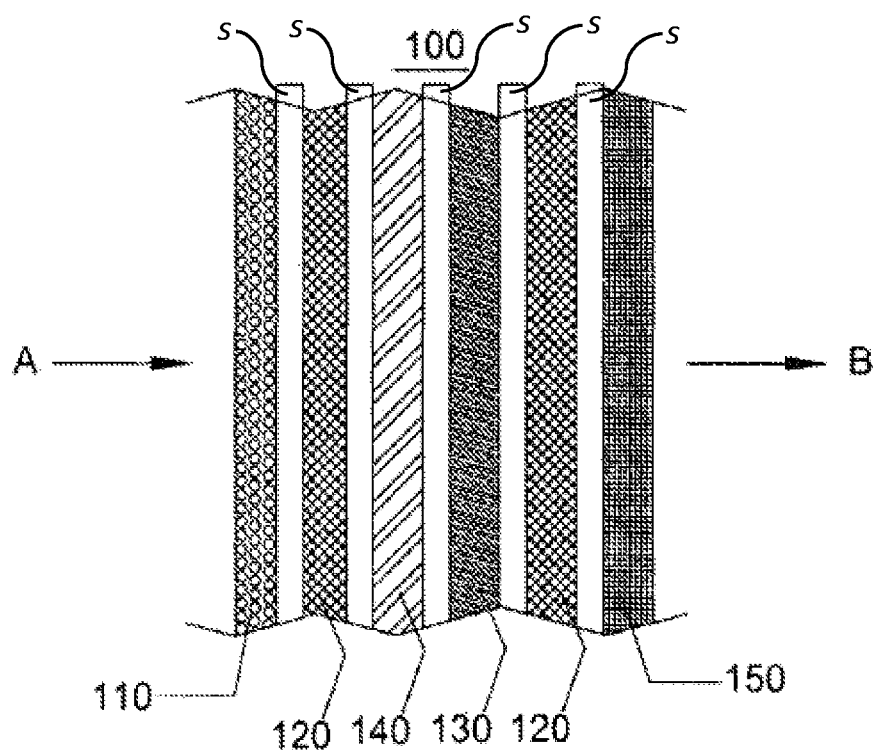
FIG. 4 is an enlarged partial side sectional view schematically showing various parts installed inside the frame of the fog barrier.
Figure 5:
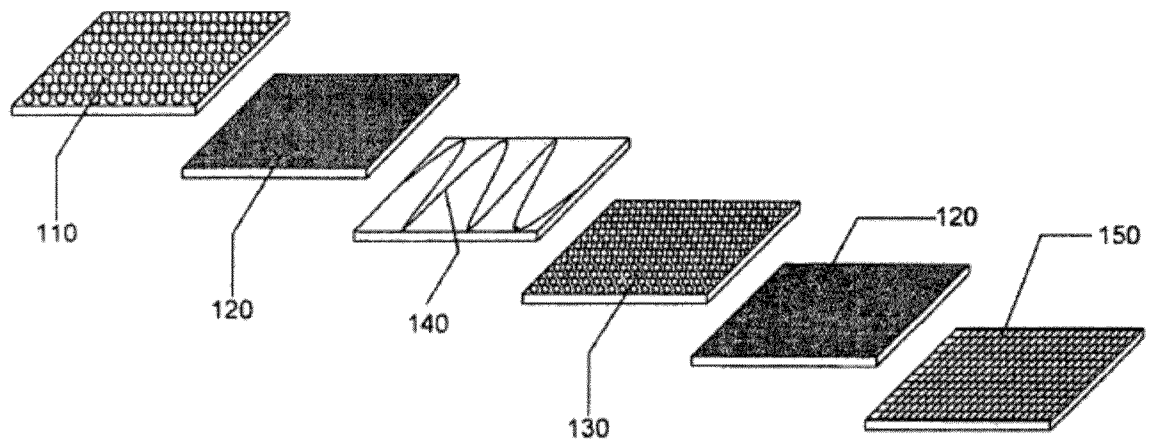
FIG. 5 is an exploded perspective view schematically showing various parts shown in FIG. 4.

Next referring to FIGS. 4 and 5, inside the frame 101 constituting the fog barrier 100 in a preferable embodiment of the fog removal apparatus 10 according to the present invention, there are several components that actually perform the function for removing fogs. As well shown in FIG. 4, from the direction A in which the fog flows into the frame 101 of the fog barrier 100 to the direction B in which the fog is discharged to the road, a perforated plate 110, a coated mesh 120, heating means 140, a super absorbent sheet 130, a coated mesh 120, and a stainless steel screen 150 are disposed, respectively, and spaced apart from each other with a predetermined spacing s.

Arranging the components within the frame of the fog barrier 101 at such a predetermined spacing s is to construct the fog through the fog barrier 100 on the wind by the naturally occurring airflow when the fog is introduced from the fog inflow direction A to the fog discharge direction B. In other words, if various components within the frame 101 of the fog barrier 100 are arranged without such a spacing s, the natural airflow including the fog that flows in the wind is blocked, thereby lowering the function of the fog barrier 100 to remove moisture contained in the fog and to discharge a dry air to the road.

In the fog barrier 100 of the fog removal apparatus 10 according to the preferred embodiment of the present invention shown in FIGS. 4 and 5, The most significant feature is the super absorbent sheet 130 that absorbs a large amount of moisture from the fog passing through the fog barrier 100.

The super absorbent sheet 130 is made of a material of a high absorbent resin or a super absorbent polymer having a very high absorbency. Therefore, as well shown in FIG. 4, the fog introduced into the frame 101 from the fog inflow direction A can be discharged to the road, in the fog discharge direction B, as the dry air having absorbed a large amount of moisture by passing through the super absorbent sheet 130. The high absorbent resin or the super absorbent polymer has a property of absorbing water which is several hundred to 1,000 times its own weight, and a graft copolymer of cellulose and acrylonitrile, a block copolymer of acrylic acid and vinyl alcohol, a copolymer of acrylic acid and vinyl alcohol, or a caustic soda polymer of acrylic acid, etc., commercially available, may be used as the super absorbent sheet 130.

Alternatively, the super absorbent sheet 130 may be composed of a non-woven fabric or any other material or materials having a high absorbency. Since the super absorbent sheet 130 is primarily intended to absorb moisture contained in the fog to reduce the relative humidity, it is needless to say that any material or materials consistent with this may be used as the super absorbent sheet 130 constituting the fog barrier 100, therefore, all of which fall within the scope of the present invention.

In the preferable embodiment shown in FIGS. 4 and 5, a coated mesh 120 is arranged on both sides of the super absorbent sheet 130. The coated mesh 120 has a porous waterproofing function that does not pass relatively large particles than fog, such as water droplet, but allows to pass only relatively small particles than fog, such as air. If water droplets such as rainwater are introduced into the fog barrier 100, a large amount of moisture permeates into the super absorbent resin or the super absorbent non-woven fabric constituting the super absorbent sheet 130, thereby lowering the function of absorbing moisture contained in the fog of the super absorbent sheet 130. To prevent this interference, the coated mesh 120 can block these droplets in advance.

Preferably, the fog having a particle size of about 0.2 mm or less passes through the coated mesh 120, whereas a raindrop having a particle size of about 2.0 mm or a shower of about 4.0 to 5.0 mm in particle size may not pass through the coated mesh 120. The water droplets that have not passed through the coated mesh 120 can be configured to flow down along the surface of the coated mesh 120.

As shown in FIGS. 4 and 5, by arranging the coated mesh 120 on both sides of the super absorbent sheet 130, it is possible to prevent water droplets such as rainwater flowing from the outside into the super absorbent sheet 130 of the fog barrier 100 along the fog inflow direction A and contacting the super absorbent sheet 130 by the coated mesh 120 arranged on the one side, meanwhile it is also possible to prevent the water droplets flowing from the road into the super absorbent sheet 130 of the fog barrier 100 along reverse direction of the fog discharge direction B and contacting the super absorbent sheet 130 by the coated mesh 120 arranged on the other side. That is, two coated mesh 120 arranged on both sides are capable of preventing inflow of droplets into the super absorbent sheet 130 from the fog inflow direction (A) and the reverse direction of the fog discharge direction (B), respectively. Therefore, it is possible to prevent all of the degradation of the super absorbent function of the super absorbent sheet 130 due to inflow of droplets such as rainwater.

Alternatively, the coated mesh 120 may be arranged on one side of the super absorbent sheet 130, that is, on the side of the fog inflow direction A, in consideration of road conditions and climatic conditions.

The fog barrier 100 of the fog removal apparatus 10 according to the preferred embodiment of the present invention is not necessary to use a separate air inlet means such as a blower for example, or a similar mechanical, electric, hydraulic, or any other type of driving means which are designed to force the air or heated air for fog removal or the air containing the material necessary for fog removal in the prior art fog removal apparatus. The fog removal apparatus according to the present invention can introduce the dry air to the road by removing a large amount of moisture in fog with the structure of the fog barrier itself by moving fogs toward the road, according to naturally occurring airflow only. That is, it is possible to remove moisture in the fog and flow the dry air on the road by merely constituting the barrier itself. Therefore, the fog which flows into the roads and would obstruct the view of the driver or the securing of the minimum safety distance can be completely removed or at least mostly reduced in an easy and quick manner.

Referring again to FIGS. 4 and 5, a perforated plate 110 is arranged on one side of the frame 101 of the fog barrier 100, that is, in the fog inflow direction A. The perforated plate 110 serves to protect and support other components arranged inside the frame 101. For example, the perforated plate 110 prevents rainwater or contaminants from introducing into the interior of the fog barrier 100 from the outside, firstly. Two perforated plates 110 may be arranged on both outer sides of the frame 101 of the fog barrier 100. That is, as though the stainless steel screen 150 is arranged on the opposite side of the perforated plate 110 in FIGS. 4 and 5, the perforated plate 110 may be provided instead of the stainless steel screen 150. The perforated plate 110 may be formed of a plate of a corrosion-resistant material formed in circular shape or any arbitrary shape.

The fog barrier 100 further comprises a heating means 140 arranged within the frame 101 and immediately adjacent to the super absorbent sheet 130. The heating means 140 is additionally installed component in order to quickly recover the water absorbing function of the coated mesh 120 and the super absorbent sheet 130 installed inside the frame 101.

More specifically, in seasons of summer or winter in which relatively no fog occurs frequently, the fog is sufficiently removed by the moisture absorption function of the coated mesh 120 and the super absorbent sheet 130 from the evening till the dawn of next day when the fog is likely to occur. Then, the coated mesh 120 and the super absorbent sheet 130 are dried naturally by the sun and the wind from morning till early evening in which there is almost no fog, and the moisture absorption function can be restored again.

On the other hand, the water absorption function of the coated mesh 120 and the super absorbent sheet 130 may decrease rapidly in the spring and autumn when fog occurs frequently. Therefore, the moisture absorption function can be quickly restored by using heating means 140 to heat and dry the coated mesh 120 and the super absorbent sheet 130.

It should be taken into account not only the seasonal effects but also the effects of climatic conditions in the area where the fog is formed. Thus, it is necessary to provide optimum conditions of the fog barrier 100 in real time regardless of the season or the region, by setting a means such as a sensor for providing necessary data, for example, the temperature and the humidity, etc., measured inside the fog barrier 100.

The heating means 140 may additionally provide a function of preventing freezing of components installed inside the fog barrier 100 in the winter as well as a function of drying the coated mesh 120 and the super absorbent sheet 130. In FIG. 5, although the heating means 140 is installed in the form of a sinusoidal curved heating wire, it is needless to say that the heating means 140 is not limited to this form. In other words, the heating means 140 may be provided in a lattice form or may be provided in any other various forms. Alternatively, the heating means 14 may be provided as a flat plate-like heating plate or point-like heat source rather than as a heating wire, and any heating means 140 provided in any shape or manner may be provided within the fog barrier 100. It is sufficient to have the function of heating and drying the coated mesh 120 and the super absorbent sheet 130 installed.

As described above, the various components of the fog barrier 100 constituting the fog removal apparatus 10 according to the preferred embodiment of the present invention shown in FIGS. 4 and 5, that is, the perforated plate 110, the coated mesh 120, the super absorbent sheet 130, the heating means 140, and the stainless steel screen 150 are arranged in a frame 101 of the fog barrier 100, and spaced apart from each other with a predetermined spacing s from one side of the direction A to the opposite side of the direction B.

The components 110, 120, 130, 140, and 150 inside the fog barrier 100 can be formed into a structure that can be assembled into a frame 101 of the fog barrier 100 by bundling the entire structure into a single cartridge. For this purpose, it is needless to say that a corresponding fixing structure should be formed inside the frame 101 of the fog barrier 100 as well. A method of bundling each component 110, 120, 130, 140, 150 in the form of a single cartridge or a method of making a corresponding fixing structure inside the frame 101 of the fog barrier 100 is well known to those skilled in the art. Therefore, this may be made in various ways known to those skilled in the art, and the related contents are not the concept of the present invention, and therefore need not be described in more detail herein.

The components 110, 120, 130, 140, and 150 configured in the form of a cartridge may be inserted into the front of the frame 101 which is connected to the fog barrier support 200 on the road, or through the side or upper surface of the frame 101 of the fog barrier 100. Such an insertion method can be performed in a most suitable manner in consideration of road conditions. Alternatively, with each component 110, 120, 130, 140, 150 being pre-inserted into the frame 101 in the form of a cartridge, each fog barrier 100, including the frame 101 may be directly coupled to the fog barrier support 200 installed on the road.

This configuration may eliminate the need for troublesome work of installing the individual parts inside the frame 101 of the fog barrier 100 on the road where the vehicles frequently travel, and may be shorten the time for maintenance work.

MODE FOR THE INVENTION

Figure 6:
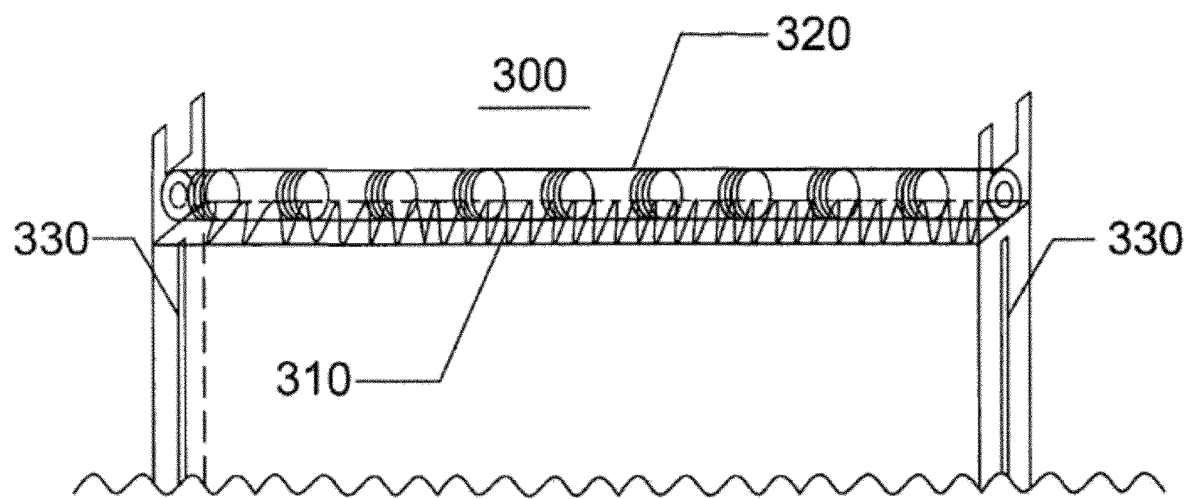
FIG. 6 is a perspective view schematically illustrating the overflow prevention apparatus in the multipurpose fog removal system according to the present invention.

Now, an overflow prevention apparatus of the multipurpose fog removal system including the fog removal apparatus according to the present invention will be described. FIG. 6 is a perspective view schematically showing the structure of an overflow prevention apparatus 300 according to a preferred embodiment of the multipurpose fog removal system according to the present invention.

The overflow prevention apparatus 300 is very effective when a large amount of fog is continuously introduced, such as in spring or autumn. More specifically, if the function of the fog barrier 100 is normally maintained in the fog removal apparatus 10 and a large amount of dry air is sufficiently introduced into the road, the fog over the upper end of the fog removal apparatus 10 would be blocked by a sufficient amount of dry air flowing through the fog barrier 100, and does not flow down the road, that is, may cross over the road and beyond the fog removal apparatus 10 installed on the opposite roadside.

On the other hand, if a large amount of fog is continuously supplied for a long time, due to the long use of the coated mesh 120 and the super absorbent sheet 130 installed in the fog barrier 100 constituting the fog removal apparatus 10, the removal function may be deteriorated so that a sufficient amount of dry air cannot flow into the road. In this situation, a so-called overflow phenomenon occurs in which fog passing above the fog barrier 100 does not cross over the road by the dry air flowing into the road but sits down on the road as it is.

In order to prevent such overflow phenomenon, the multipurpose fog removal system comprising the fog removal apparatus according to the present invention further comprises the overflow prevention apparatus 300 as shown in FIG. 6. Therefore, on one hand, heating means 140 installed inside the fog barrier 100 is to heat and dry the coated mesh 120 and the super absorbent sheet 130 as described above with reference to FIGS. 4 and 5 in order to quickly and normally restore the fog removal function of the fog barrier 100; on the other hand, the overflow prevention apparatus 300 is to provide the hot dry air with the upper portion of the fog barrier 100, thereby inducing the humid air contained in the fog riding over the fog barrier 100 to pass over to the other side of the road, and creating a double-blocked structure in which the air flow to the road is controlled as a whole.

Referring to 6, an overflow prevention apparatus 300 installed on the upper end of the fog barrier support 200 of the fog removal apparatus 10 comprises a heating means 310, and orientation means 320.

The heating means 310 is provided in the form of a sinusoidal curved heating wire along the top of the fog barrier support 200. However, the heating means 310 is not necessarily limited to this type, and it is also possible to use a heating means 310, which is provided in any shape or manner, similar to the heating means 140 as described above with respect to FIGS. 4 and 5.

The orientation means 320 serves to orient the air heated by the heating means 310 upward of the fog removal apparatus 10. One preferred embodiment of this orientation means 320 is well shown in FIG. 7, which consists of a rotational body including a plurality of blades rotating in one direction along the top of the fog barrier support 200.

Figure 7:
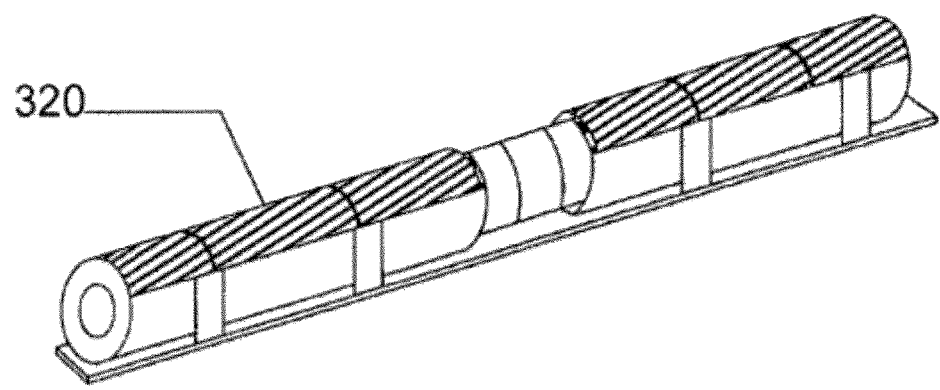
FIG. 7 is a perspective view of an orientation means for discharging air upward in the overflow prevention apparatus shown in FIG. 6.

Referring to FIG. 7, a motor is connected to the middle of the proposed rotational body, and the rotational body of this type is an air curtain type. The rotational body used as the orientation means 320 of the overflow prevention apparatus 300 according to the present invention is to direct the air heated by the heating means 310 upward of the fog removal apparatus 10, as compared with the common air curtain used for cooling the building generally discharges the cooling air from the upper portion to the lower portion.

The orientation means 320 is not limited to the rotational body of the preferred embodiment shown in FIG. 7, but any type of structure such as a blower type may be used.

Meanwhile, as schematically shown in FIG. 6, the overflow prevention apparatus 300 includes a blowing means 330 for supplying air upward from the fog barrier 100 through air passages provided on both sides of the fog barrier support 200. The blowing means 330 is designed to upwardly exhaust, through the air passages provided on both sides of the fog barrier support 200, a portion of air which collides with a plurality of components 110, 120, 130, 140, 150 inside the fog barrier 100 when the fog is blown toward the fog barrier 100 and which is not discharged to the road. Therefore, it is not necessary to use a separate power source for constructing the blowing means 330, or to provide a separate device such as a blower, that is, it is enough to simply discharge a part of the incoming wind through air passages of the fog barrier support 200.

Now referring to FIGS. 8 to 11, several embodiments of a wind prevention apparatus installed in a multipurpose fog removal system comprising a fog removal apparatus according to the present invention will be described.

Generally, in an environment where a strong wind is blowing on a road, a fog generating condition is not formed but a fog disappears naturally. On the other hand, due to strong winds, facilities installed on a road such as a fog removal apparatus may be damaged, which may also cause damage to high speed vehicles on the road. The multipurpose fog removal system according to another aspect of the present invention comprises a wind prevention apparatus that prevents the strong external wind pressure from damaging the fog removal apparatus or affecting the running vehicle due to the fact that fog removal apparatus is fixed vertically.

Preferably, the fog barrier of the fog removal apparatus can be rotated to be tilted about the axis of rotation of the frame of the fog barrier rotatably supported on the fog barrier support to withstand the strong wind pressure. In this way, the fog barrier is designed to be rotated so as to be tilted to a predetermined angle automatically according to the strong wind pressure by the wind prevention apparatus, and it is configured to be returned to the original fixed position when the wind is weakened and the wind pressure weakens.

Figure 8:
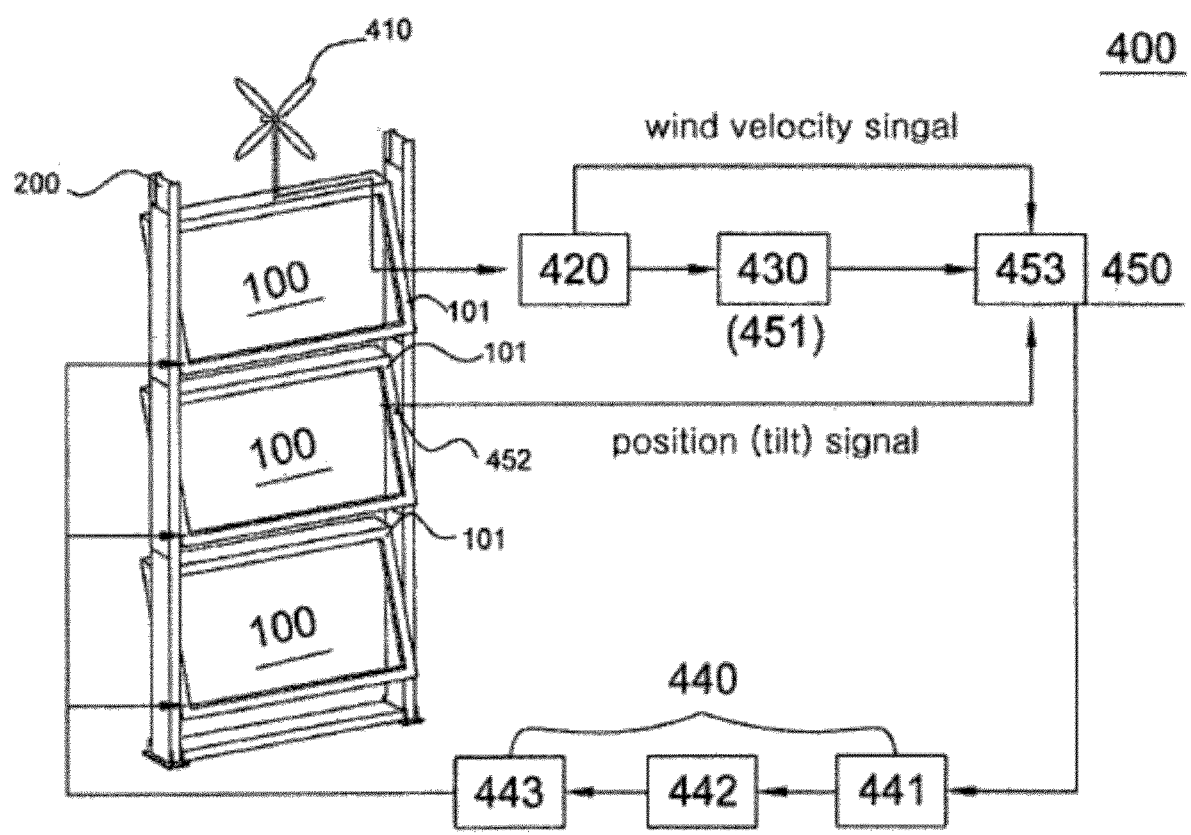
FIG. 8 is a perspective view schematically showing a first embodiment of a wind prevention apparatus of a multipurpose fog removal system.

FIG. 8 is a perspective view schematically showing a first embodiment of a wind prevention apparatus 400 of a multipurpose fog removal system according to the present invention. Referring to FIG. 8, the wind prevention apparatus 400 includes a rotational body 410 installed at the upper end of the fog barrier support 200 and rotating in one direction according to the wind direction and converting wind energy into mechanical energy, a generator 420 for converting the mechanical energy generated by the rotational body 410 into electrical energy, a charger 430 for storing power generated from the generator 420, actuating means 440 for tilting the fog barrier 100 at an angle, and control means 450 for controlling the actuation means 440 based on the wind velocity passing through the fog barrier 100.

In FIG. 8, although the rotational body 410 is configured in the form of a propeller, it may be replaced by any other form and structure of apparatus capable of converting the wind energy of wind passing through the fog barrier 100 into mechanical energy.

The important point here is that the rotational body 410 rotates only from the fog inflow direction A of the fog barrier 100 constituting the fog removal apparatus 10 to the fog discharge direction B, in other words, the rotational body 410 should be a structure that rotates in one direction only. Therefore, for the wind blowing from the fog barrier 100 side, that is, from the fog discharge direction B to the fog inflow direction A, the rotational body 410 should not be rotated. As will be described later in detail, when the fog barrier 100 of the fog removal apparatus 10 is rotated to be tilted about the rotation axis of the frame 101 connected to the fog barrier support 200, it must not be tilted in the reverse direction.

The control means 450 comprises a wind velocity sensor 451 for sensing the intensity of the wind velocity according to the rotation of the rotational body 410, a position sensor 452 for sensing the tilt of the fog barrier 100 that is rotatably actuated by the actuating means 440, and a central processing unit (CPU) 453 for generating a control signal to operate the actuating means 440 at a predetermined magnitude by comparing the wind velocity signal inputted from the wind velocity sensor 451 with the tilt signal of the fog barrier 100 inputted from the position sensor 452.

The actuating means 440 comprises a driver 441 driven by the power supplied from the charger 430 in accordance with the control signal of the control means 450, a motor 442 operated by a driver 441, and an actuation rod 443 connected to the motor 442 to rotate the fog barrier 100 to be tiled at a predetermined angle.

In this configuration, when a wind below at a predetermined pressure is blowing into the fog barrier 100 of the fog removal apparatus 10, the rotational body 410 installed at the upper end of the fog barrier support 200 rotates to convert the wind force into mechanical power, this mechanical energy is converted into electrical energy through a generator 420 and stored in a charger 430. The wind velocity is sensed through a rectifier acting as an wind velocity sensor 451 installed inside the charger 430, and the wind velocity sensing signal generated by the wind velocity sensor 451 is transmitted to control means 450. The position (inclination) signal of the fog barrier 100 generated by the position (tilt) sensing sensor 452 for measuring the tilt of the fog barrier 100 installed in the frame of the fog barrier 101 of the fog barrier 100 is also transmitted to control means 450. The wind velocity signal and the tilt signal of the fog barrier 100 are compared by the CPU 453 of the control means 450. As described above, if the wind pressure calculated from the wind velocity signal is below the predetermined pressure, the CPU 453 of the control means 450 maintains the tilt of the fog barrier 100 at zero, that is, the vertical fixed position.

On the other hand, if a strong wind of a predetermined pressure or more is blown from the fog inflow direction toward the fog discharge direction B, wind pressure of the wind, as shown in FIG. 4, the CPU 453 immediately transmits the corresponding tilt signal of the fog barrier 100 to the actuating means 440. Accordingly, the actuating means 440 sequentially actuates the driver 441, the motor 442, and the actuation rod 443, respectively, to push the frame 101 of the fog barrier 100 from the direction A to the direction B. The fog barrier 100 rotates to the direction B, and the magnitude of the rotation operation of the fog barrier 100, that is, the tilt thereof, is the distance traveled by the actuation rod 443 according to a predetermined value calculated in advance in proportion to the wind pressure transmitted from the CPU 453 to the actuating means 440.

Accordingly, strong wind passing through the fog barrier 100 is directed upward through a path between the fog barrier 100 and the fog barrier support 200 formed as the fog barrier 100 is tilted. As a result, it is possible to reduce the wind pressure due to the strong wind acting on the fog barrier 100 so that the fog barrier 100 can withstand the effect of blocking the strong wind, and the vehicle running on the road may be directly affected by the wind.

Meanwhile, when the wind pressure applied to the fog barrier 100 is reduced, the wind velocity sensor 451 in the form of a rectifier installed in the charger 430 inputs the wind velocity signal again to the central processing unit (CPU) 453 of the control means 450, and a tilt (position) signal is transmitted from the CPU 453 to the actuating means 440 to rotate the fog barrier 100 back to its original fixed position so that the actuation rod 443 is moved to the frame 101 of the fog barrier 100 to its original fixed position.

By installing the wind prevention apparatus 400 having such a configuration in a multipurpose fog removal system comprising the fog removal apparatus 10 according to the present invention, it is possible to provide the fog removal apparatus 10 with a windshield structure capable of preventing damage due to strong wind as well as eliminating traffic accidents caused by strong winds applied to vehicles running. The predetermined wind pressure for starting the rotation operation of the fog barrier 100 can be set at a wind velocity of 10 m/sec, for example, and it is set to an appropriate size in consideration of the installation state, weight, road conditions, etc. of the fog barrier 100.

In the embodiment shown in FIG. 8, a rectifier installed inside the charger 430 is configured to function as a wind velocity sensor 451 which is connected to the generator 420 before the current is charged from the generator 420 to the charger 430. It is designed to detect the wind velocity by measuring the passing frequency. Alternatively, instead of using a rectifier, a separate wind velocity sensor 451 may be installed directly at or near the components of the fog removal apparatus 10, such as the fog barrier support 200, and may be connected to the CPU 453 of the control means 450.

On the other hand, instead of directly installing the position sensor 452 measuring the position (tilt) of the fog barrier 100 as shown in FIG. 8, a tilt detection sensor 452 for detecting the tilt of the fog barrier 100 by measuring the movement of the actuation rod 443 based on the number of revolutions of the motor 442 of the actuation means 440. Thus, the construction of the wind velocity sensor 451 and the position (inclination) detection sensor 452 are generally known in various forms, so that a detailed description thereof will be omitted.

Figure 9:
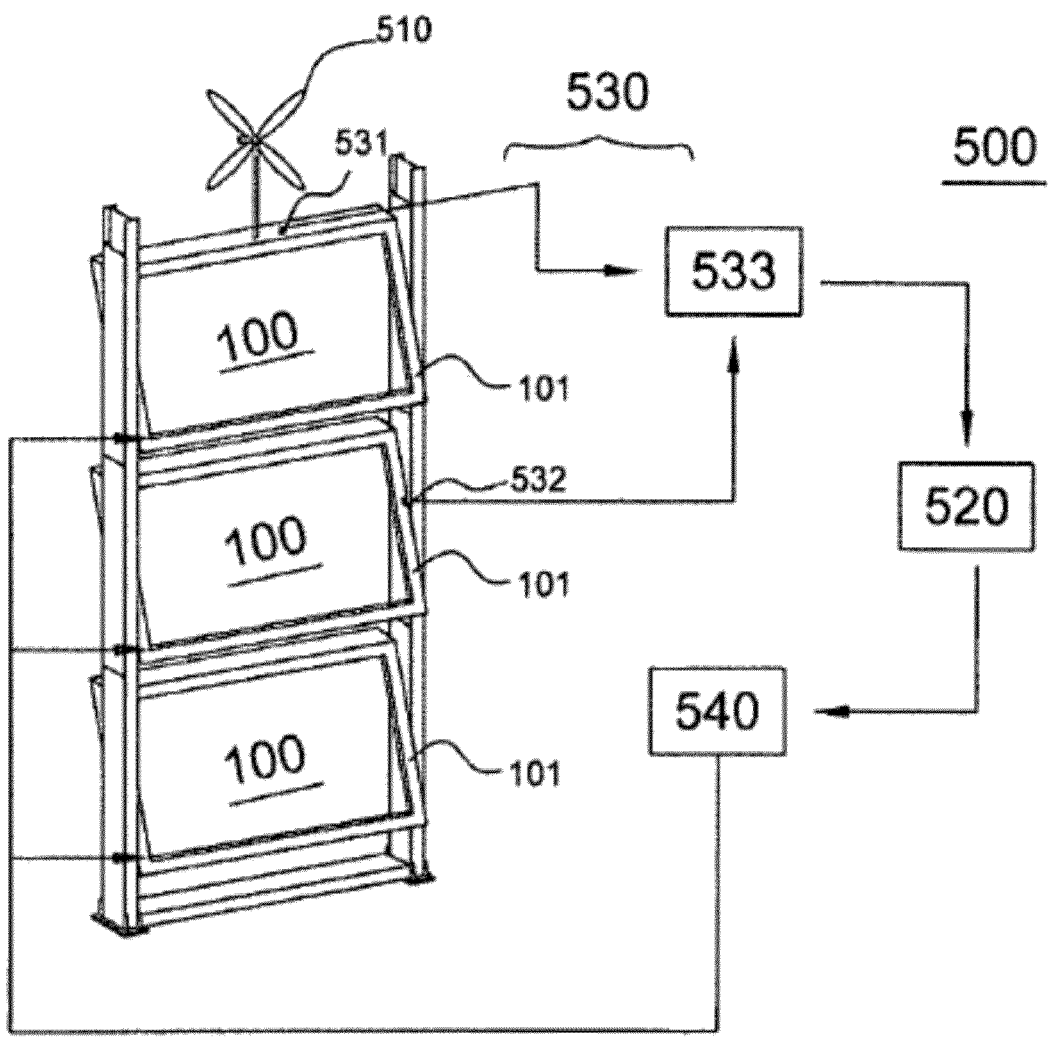
FIG. 9 is a perspective view schematically showing a second embodiment of a wind prevention apparatus of a multipurpose fog removal system.

FIG. 9 is a perspective view schematically showing a second embodiment of a wind prevention apparatus 500 of a multipurpose fog removal system according to the present invention. Referring to FIG. 9, the wind prevention apparatus 500 comprises: a rotational body 510 installed at the upper end of the fog barrier support 200 and rotating in one direction according to the wind direction and converts wind energy into mechanical energy; a gear box 520 connected to the rotational body 510 and operating respectively in a forward position, a reverse position, and a neutral position; control means 530 comprising a wind velocity sensor 531 for sensing an intensity of a wind velocity passing through the fog barrier 100, a position sensor 532 for detecting a tilt of the fog barrier 100, and a central processing unit (CPU) 533 for generating a control signal for controlling the gear box 520 to operate in the forward position, the reverse position, and the neutral position, respectively, in accordance with a wind velocity signal inputted from the wind velocity sensor 531 and a tilt signal inputted from the position sensor 532; and an actuation rod 540 connected to the gear box 520 for rotating the fog barrier 100 to be tilted to a predetermined angle.

The wind prevention apparatus 500 according to the second embodiment of the present invention is basically similar to the wind prevention apparatus 400 according to the first embodiment described above with reference to FIG. 8, therefore, the description of the parts having the same function can be referred to the above description.

In the wind prevention apparatus 500 shown in FIG. 9, when the wind pressure according to the wind velocity sensed by the wind velocity sensor 531 exceeds a predetermined pressure, the gear box 520 is operated in the forward position so that the actuation rod 540 rotates the fog barrier 100 to be tilted to the predetermined angle. The gear box 520 is operated in the neutral position in a state in which the fog barrier 100 is tilted at the predetermined angle. When the wind pressure according to the wind velocity sensed by the wind velocity sensor 531 is below the predetermined pressure, the gear box 520 is operated in the reverse position so that the actuation rod 540 rotates the fog barrier 100 to its original fixed position. The gear box 520 is operated in the neutral position after the fog barrier 100 is returned its original fixed position.

The operation of the gear box 520 in the forward position, the reverse position and the neutral position can be controlled by the CPU 533 of the control means 530 and the gear box 520 can be controlled, for example, clutch type coupling structure. The components of the wind prevention apparatus 500 according to the second embodiment shown in FIG. 9 can be changed or modified in various ways known to those skilled in the art of maintaining the corresponding operation and function, thus, further discussion of this need not be described in more detail herein.

Figure 10:
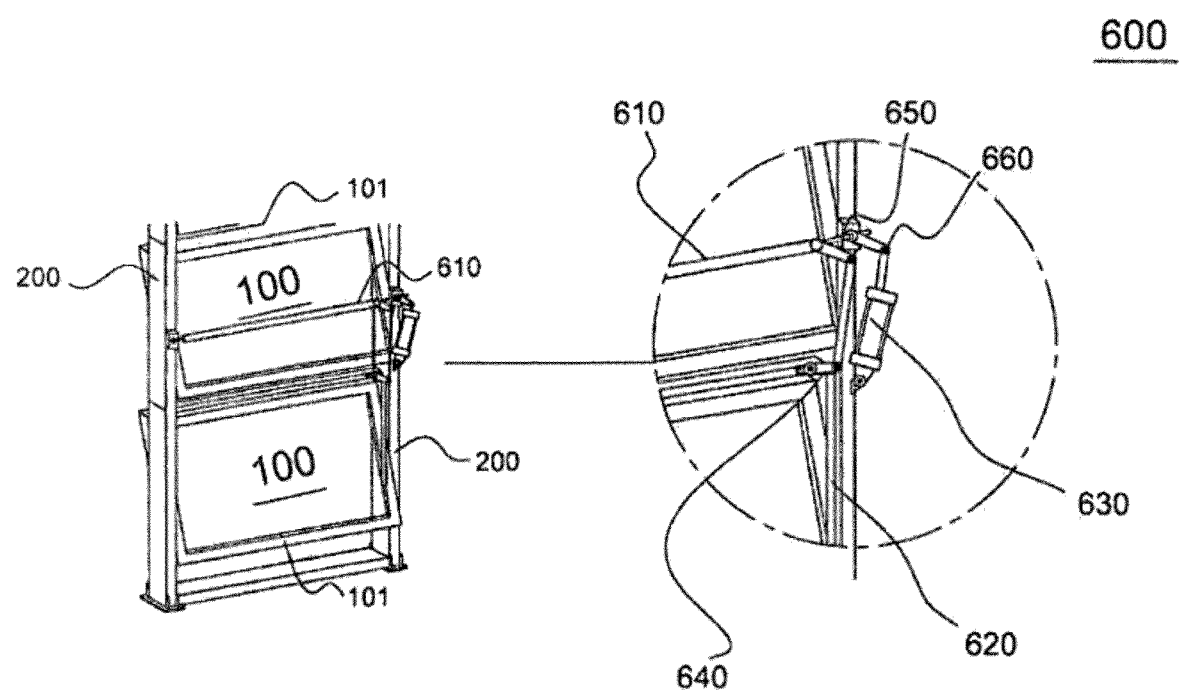
FIG. 10 is a perspective view schematically showing a third embodiment of a wind prevention apparatus of a multipurpose fog removal system.

FIG. 10 is a perspective view schematically showing a third embodiment of a wind prevention apparatus 600 of a multipurpose fog removal system according to the present invention. Referring to FIG. 10, a wind prevention apparatus 600 comprises: a cross bar 610 rotatably supported on both sides of a fog barrier support 200; a damper 630 fixed to one side of the fog barrier support 200; a first actuation rod 640 having one end fixed to the frame 101 of the fog barrier 100; a weight body 620 having one end fixed to the other end of the first actuation rod 640 and other end configured as a free end; a second actuation rod 650 having two actuation rods, wherein one end of the one actuation rod of the second actuation rod 650 is fixed to the cross bar 610, one end of the other actuation rod of the second actuation rod 650 is fixed to the one end of the weight body 620, and other end of the one actuation rod of the second actuation rod 650 and other end of the other actuation rod of the second actuation rod 650 are rotatably connected together; and a third actuation rod 660 having two actuation rods, wherein one end of the one actuation rod of the third actuation rod 660 is fixed to the cross bar 610, one end of the other actuation rod of the third actuation rod 660 is fixed to the damper 630, and other end of the one actuation rod of the third actuation rod 660 and other end of the other actuation rod of the third actuation rod 660 are rotatably connected together.

When the first actuation rod 640 is lifted up by the rotational movement of the frame 101 of the fog barrier 100, the second actuation rod 650 is lifted and the cross bar 610 is rotated to lift the third actuation rod 660 together, and the third actuation rod 660 is lifted to pull the damper 630 outward. On the other hand, when the fog barrier 100 is returned to the original fixed position in the rotated state, the first actuation rod 640 is pulled down by the rotation operation of the frame 101 of the fog barrier 100, the second actuation rod 650 is pulled down and the cross bar 610 rotates to apply force to the third actuation rod 660 causing the third actuation rod 660 to be pulled down together. The third actuation rod 660 is pushed downward to push the damper 630 inward while compressing the damper 630. The damper 630 acts to mitigate the impact when the fog barrier 100 returns to its original fixed position.

The damper 630 may be constructed in a pneumatically or hydraulically actuated cylinder type or may be constructed in a gas absorber manner.

In the wind prevention apparatus 600 according to the third embodiment of the present invention, the weight of the weight body 620 is set to hold the fog barrier 100 at a fixed position by the weight of the weight body 620 when the wind pressure applied to the fog barrier 100 is lower than a predetermined pressure, and to rotate the fog barrier 100 to be tilted to a predetermined angle from the fixed position when the wind pressure applied to the fog barrier 100 is equal to or higher than the predetermined pressure.

The weight of the weight body 620 may be determined based on a predetermined pressure corresponding to the wind pressure that initiates the rotational operation of the fog barrier 100 and may be set, for example, at an air velocity of 10 m/sec, this should be determined at an appropriate size considering the installation state and weight of the fog barrier 100 and road conditions, etc., as described above.

Figure 11:
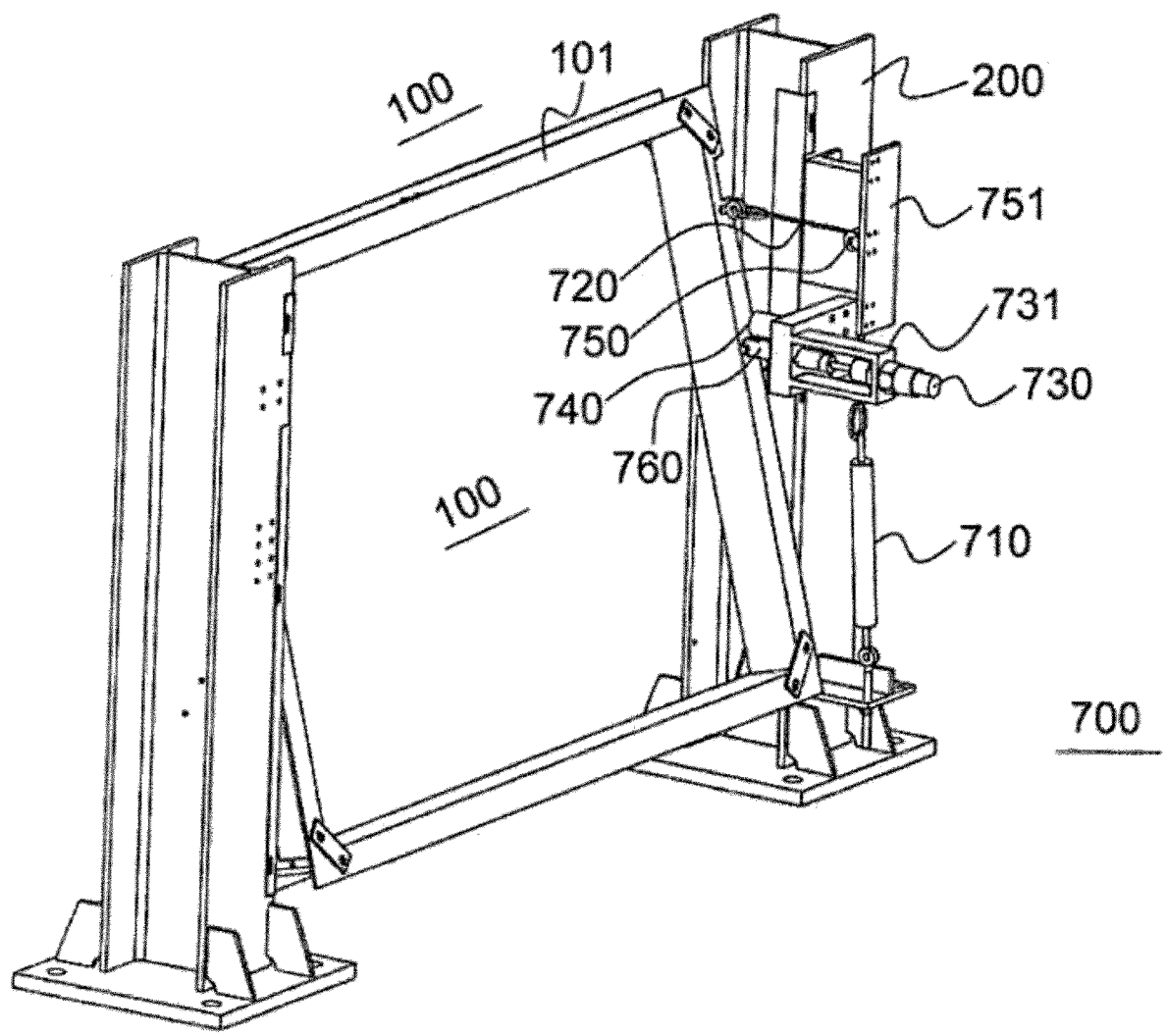
FIG. 11 is a perspective view schematically showing a fourth embodiment of a wind prevention apparatus of a multipurpose fog removal system.
Figure 12:
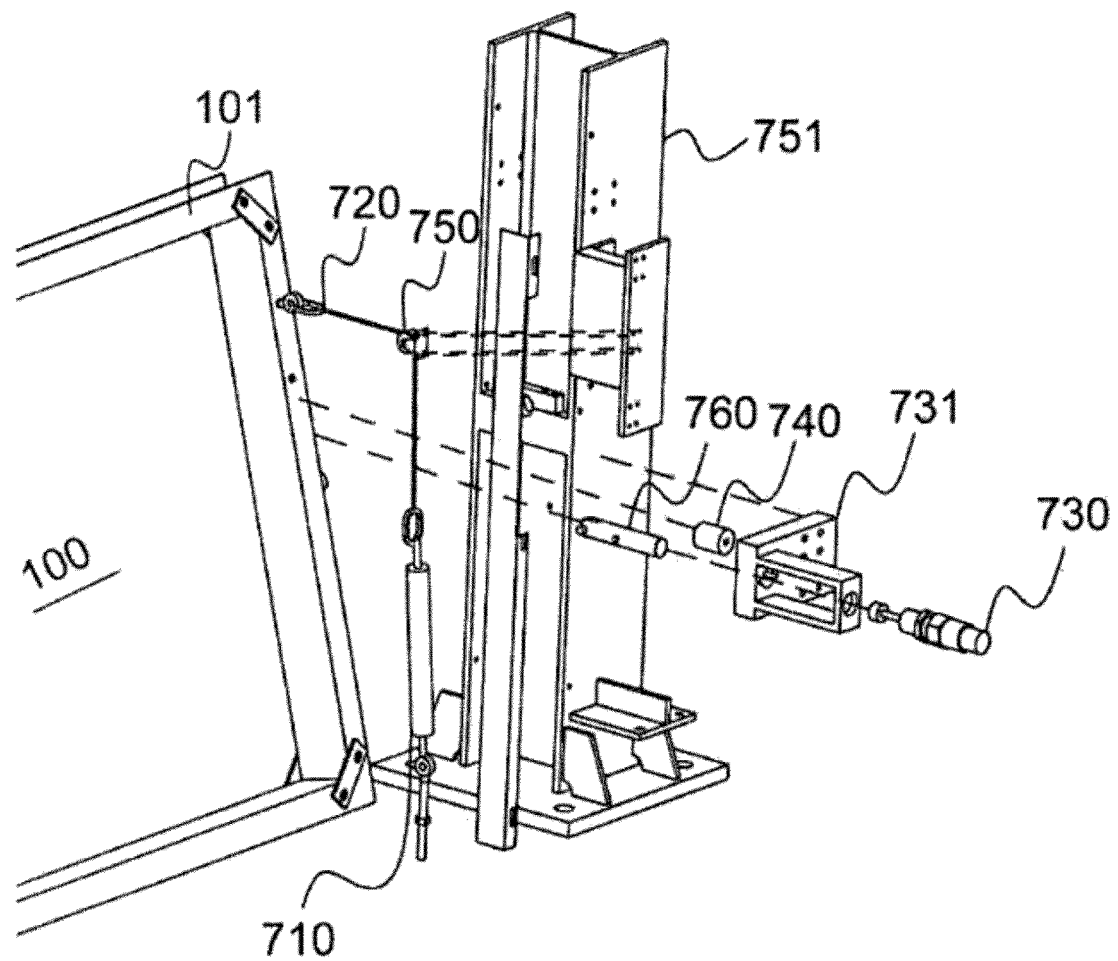
FIG. 12 is an exploded perspective view of the wind prevention apparatus according to the fourth embodiment shown in FIG. 11.

FIG. 11 is a perspective view schematically showing a fourth embodiment of a wind prevention apparatus of a multipurpose fog removal system according to the present invention, and FIG. 12 is a cross-sectional view of a wind prevention apparatus of a multipurpose fog removal system of FIG. 11.

Referring to FIGS. 11 and 12, the wind prevention apparatus 700 according to the fourth embodiment comprises: a spring 710 having one end fixed to the lower end of the fog barrier support 200 and tensioned when the tensile force applied to the spring 710 is higher than a predetermined pressure; an wire 720 having one end connected to the other end of the spring 710, and other end fixed near the upper part of the frame 101 of the fog barrier 100; a damper 730 installed in contact with the frame 101 of the fog barrier 100; a mount 731 for securing the damper 730 to the fog barrier support 200; and a stopper 740 fixed to the damper.

When the wind pressure applied to the fog barrier 100 is more than the predetermined pressure so that the fog barrier 100 is rotated to be tilted to a predetermined angle from a fixed position, the wire 720 moves along the frame 101 of the fog barrier 100 to apply a tensile force to the spring 710. When the wind pressure applied to the fog barrier is below the predetermined pressure, the wire 720 pulls the fog barrier 100 by the restoring compressive force of the spring 710 to the fixed position. When the wind pressure applied to the fog barrier is less than the predetermined pressure so that the fog barrier 100 returns to the fixed position by the restoring compressive force of the spring 710, the damper 730 mitigates any shock of the fog barrier 100. When the fog barrier 100 returns to the fixed position by the restoring compression force of the spring 710, the stopper 740 contacts the frame 101 of the fog barrier 100 to maintain the fog barrier 100 at the fixed position.

The structure and operation of the wind prevention apparatus 700 according to the fourth embodiment shown in FIGS. 11 and 12 are similar to those of the wind prevention apparatus 600 according to the third embodiment described above with reference to FIG. 10. For example, a damper 730 of the wind prevention apparatus 700 according to the fourth embodiment shown in FIGS. 11 and 12, like the damper 630 of the wind prevention apparatus 600 according to the third embodiment described above, may also be constructed in a pneumatic or hydraulically operated cylinder type or in a gas absorber manner.

As compared with the case where the wind prevention apparatus 600 shown in FIG. 10 is determined based on the predetermined pressure corresponding to the wind pressure at which the rotation operation of the fog barrier 100 is started by the weight of the weight body 620, the tension of the tension spring 710 having one end fixed to the lower end of the fog barrier support 200 is determined based on the wind pressure initiating the rotation operation of the fog barrier 100. The tension of the spring 710 can be adjusted by the adjustment bolts provided below.

As well shown in FIG. 11, the wind prevention apparatus 700 according to the fourth embodiment further comprises a roller 750 fixed to a mount 751 which is attached to the fog barrier support 200, and a contact member 760 having one end connected to the damper 730 through the mount 731 for the damper 730, and other end contacting the frame 101 of the fog barrier 100.

The wire 720 is preferably configured to operate smoothly in response to tension and compression of the spring 710 by winding around the roller 750, and the other end of the contact member 760 in contact with the frame 101 of the fog barrier 100 is rounded so that the barrier 100 and the contact member 760 can smoothly move in contact with each other.

Figure 13:
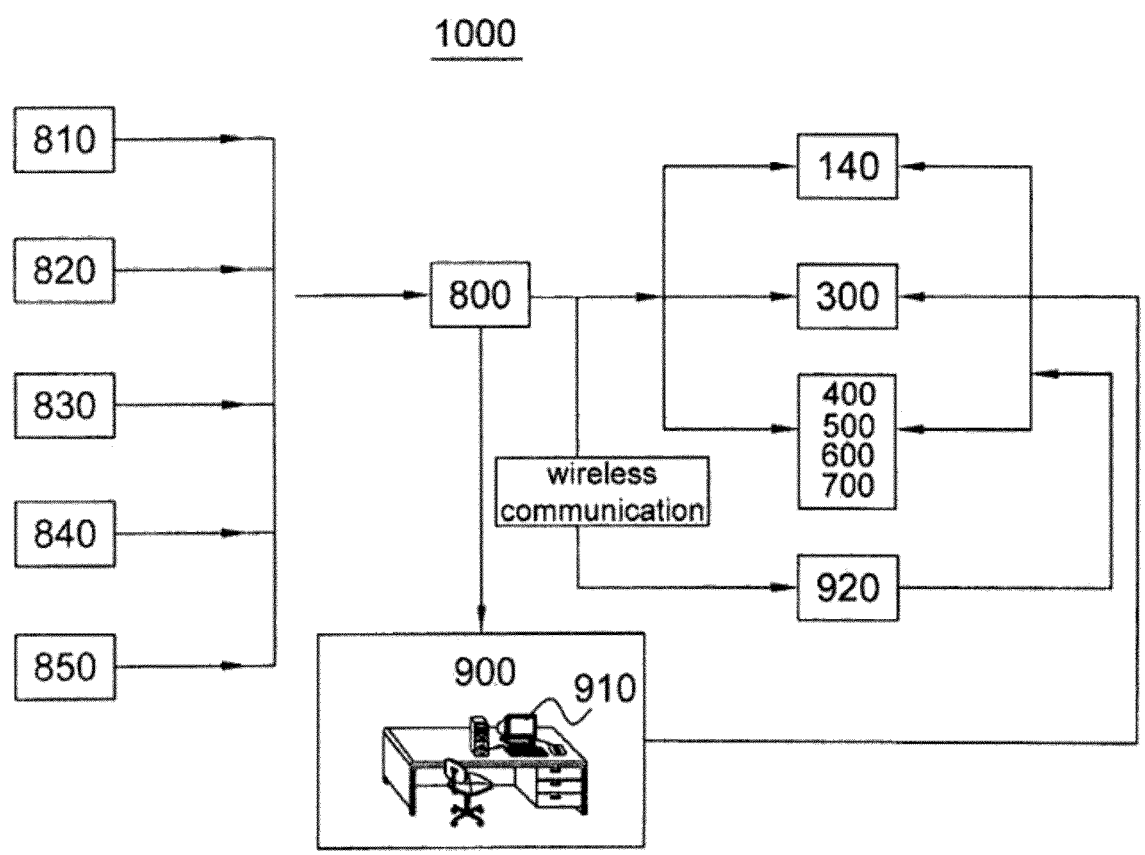
FIG. 13 is a block diagram schematically showing the entire structure of a multipurpose fog removal system according to the present invention.

FIG. 13 is a block diagram schematically showing the structure of a multipurpose fog removal system 1000 according to the present invention. Referring to FIG. 13, a multipurpose fog removal system 1000 comprises an automatic control panel 800 configured to receive, respectively, a fog sensing signal, an image output signal, and an wind direction/velocity signals provided from a fog sensing device 810, CCTV 820, and a wind sensing device 830, and configured to receive, respectively, temperature/humidity signals provided from temperature/humidity measurement sensors 840 and a tilt signal of the fog barrier provided from a position sensor 850 for sensing the tilt of the fog barrier 100. Preferably, the automatic control panel 800 includes programmable logic controller (PLC) and a communication card for Ethernet communication.

In the multipurpose fog removal system 1000 according to the present invention configured as described above, heating means 140 for heating and drying the coated mesh 120 and the super absorbent sheet 130, the overflow prevention apparatus 300, and the wind prevention apparatus 400 (500; 600; 700) can be controlled manually by operators in a central control regulating station 900 or automatically based on various signals and data received by the data receiving set 910 of a central control regulating station 900 via the automatic control panel 800.

Preferably, the various signals and data received by the automatic control panel 800 are provided to a portable terminal 920 of an operator outside the central control regulating station 900 via wireless communication. As a result, heating means 140 for heating and drying the coated mesh 120 and the super absorbent sheet 130, the overflow prevention apparatus 300, and the wind prevention apparatus 400 (500; 600; 700) of the multipurpose fog removal system 100 according to the present invention can be controlled remotely and wireless.

INDUSTRIAL APPLICABILITY

Until now, the detailed configuration of the fog removing device and the multipurpose fog removing system including the same according to the present invention and the operation thereof have been explained through various preferred embodiments, modifications or alterations to the details of construction or the overall structure of the components of the invention, which have been illustrated by way of example, may be altered optionally within the scope of the extent not departing from the spirit of the present invention.

The invention claimed is:

1. A fog removal apparatus installed in a fog area, comprising a plurality of fog barriers for removing moisture in fog by absorbing moisture in the fog and by allowing air to pass therethrough when the fog passes through the plurality of fog barriers on the wind, and a fog barrier support for supporting each of the plurality of fog barriers, the fog barrier support being connected to a frame surrounding the exterior of each of the plurality of fog barriers,
wherein the plurality of fog barriers consist of an array of one or more fog barriers that extends in a horizontal direction and a vertical direction, each of the plurality of fog barriers comprising:
one or more perforated plates having a plurality of holes, and being arranged on one or both of two outer surfaces of the frame to support each of the plurality of fog barriers, each of the plurality of holes being formed in a shape;
a coated mesh having a porous waterproofing function that passes particles relatively smaller than fog particles but does not pass particles relatively larger than fog particles;
a super absorbent sheet for absorbing a large amount of moisture from fog passing through the plurality of fog barriers; and
a heating means arranged in the interior of each of the plurality of fog barriers adjacent to the super absorbent sheet to heat and dry the coated mesh and the super absorbent sheet;
wherein the one or more perforated plates, the coated mesh, the heating means, and the super absorbent sheet are spaced apart from each other at a predetermined distance arranged from a side of fog inflow to an opposite side of fog discharge of each of the plurality of fog barriers.

2. The fog removal apparatus of claim 1, wherein the super absorbent sheet comprises a plurality of holes punctured in an arbitrary shape.

3. The fog removal apparatus of claim 2, wherein the one of the one or more perforated plates consists of a plate of corrosion-resistant material, and is arranged on an outer surface of one side of the frame, and wherein each of the plurality of fog barriers further comprises a stainless steel screen disposed on an outer surface of the side of fog discharge of each of the plurality of fog barriers, wherein the shape of the plurality of holes is a circular shape.

4. The fog removal apparatus of claim 3, further comprising a second coated mesh, wherein the coated mesh and the second coated mesh are arranged on opposite A sides of the super absorbent sheet.

5. The fog removal apparatus of claim 4, further comprising a second super absorbent sheet, wherein the super absorbent sheet and the second super absorbent sheet are arranged with the heating means in between.

6. The fog removal apparatus of claim 1, wherein the array is a 2×3 array arranged in horizontal and vertical directions, respectively, wherein the frame is formed in a rectangular shape, and wherein the frame has a width of 2.0 m to 4.0 m and a height of 0.5 m to 1.0 m.

7. The fog removal apparatus of claim 1, wherein the super absorbent sheet is made of a super absorbent resin or a super absorbent polymer.

8. The fog removal apparatus of claim 1, wherein the super absorbent sheet is made of a super absorbent nonwoven fabric.

9. A multipurpose fog removal system comprising a fog removal apparatus installed in a fog area, the fog removal apparatus comprising a plurality of fog barriers for removing moisture in fog by absorbing moisture in the fog and by allowing air to pass therethrough when the fog passes through the plurality of fog barriers on the wind, and a fog barrier support for supporting each of the plurality of fog barriers, the fog barrier support being connected to a frame surrounding the exterior of each of the plurality of fog barriers,
  wherein the plurality of fog barriers of the fog removal apparatus consist of an array of one or more fog barriers that extends in a horizontal direction and a vertical direction;
  wherein each of the plurality of fog barriers comprises:
  a perforated plate of corrosion-resistant material having a plurality of holes and being arranged on one outer surface of the frame to support each of the plurality of fog barriers, each of the plurality of holes being formed in a circular shape;
  a coated mesh having a porous waterproofing function that passes particles relatively smaller than fog particles but does not pass particles relatively larger than fog particles;
  a super absorbent sheet consisting of a highly absorbent resin, a highly absorbent polymer, or a highly absorbent non-woven fabric for absorbing large amount of moisture from fog passing through the plurality of fog barriers, and having a plurality of holes spaced apart from each other at a predetermined distance and perforated in a circular shape;
  a heating means arranged adjacent to the super absorbent sheet to heat and dry the coated mesh and the super absorbent sheet; and
  a stainless steel screen arranged on an opposing outer surface of the frame with respect to the perforated plate to support each of the plurality of fog barriers;
  wherein the perforated plate, the coated mesh, the heating means, the super absorbent sheet, and the perforated plate of each of the plurality of fog barriers are spaced apart from each other at a predetermined distance arranged from an inflow side to an opposite discharge side of each of the plurality of fog barriers;
  wherein the multipurpose fog removal system further comprises:
  an overflow prevention apparatus arranged at an upper end of the fog barrier support so as to provide an upward flow of air to prevent an overflow phenomenon wherein the fog passes over the fog removal apparatus; and a wind prevention apparatus configured to tilt and rotate the plurality of fog barriers to a predetermined angle about a rotation axis of the frame.

10. The multipurpose fog removal system of claim 9, wherein the overflow prevention apparatus comprises:
  a heating means arranged at the top of the fog barrier support; and
  an orientation means for orienting air heated by the heating means upward.

11. The multipurpose fog removal system of claim 10, wherein the orientation means comprises a rotational body including a plurality of blades rotating in one direction along an upper end of the fog barrier support.

12. The multipurpose fog removal system of claim 11, wherein the orientation means further comprises blowing means for supplying air upwardly through air passages provided on sides of the fog barrier support.

13. The multipurpose fog removal system of claim 9, wherein the wind prevention apparatus comprises:
  a rotational body which is installed at an upper end of the fog barrier support, and which rotates in one direction in response to the wind, and converts wind energy into, mechanical energy;
  a generator for converting the mechanical energy generated by the rotational body into electric energy;
  a charger for storing electric power generated from the generator;
  actuating means for rotating the plurality of fog barriers to be tilted at the predetermined angle by using electric power supplied from the charger; and
  control means for controlling operation of the actuating means based on a velocity of air passing through the plurality of fog barriers.

14. The multipurpose fog removal systems of claim 13, wherein the control means comprises:
  a wind velocity sensor for sensing an intensity of a wind velocity according to rotation of the rotational body;
  a position sensor for sensing a tilt of the plurality of fog barriers operated by the actuating means; and
  a central processing unit for generating a control signal for operating the actuating means to a predetermined magnitude by comparing a wind velocity signal input from the wind velocity sensor and a tilt signal of the plurality of fog barriers inputted from the position sensor,
  wherein the actuating means comprises:
  a driver driven by electric power supplied from the charger in accordance with the control signal of the control means;
  a motor operated by the driver; and
  an actuation rod connected to the motor for rotating the plurality of fog barriers to be tiled at the predetermined angle.

15. The multipurpose fog removal system of claim 9, wherein the wind prevention apparatus comprises:
  a rotational body in the form of a rotating propeller installed at the upper end of the fog barrier support, wherein the rotational body is configured to rotate in one direction in response to the wind and to convert a wind power energy into a mechanical energy;
  a gear box connected to the rotational body that is configured to operate in a forward position, a reverse position, and a neutral position;
  control means comprising a wind velocity sensor for sensing an intensity of a wind velocity passing through the plurality of fog barriers, a position sensor for detecting a tilt of the plurality of fog barriers, and a central processing unit for generating a control signal for controlling the gear box to operate in the forward position, the reverse position, and the neutral position, respectively, in accordance with a wind velocity signal inputted from the wind velocity sensor and a tilt signal inputted from the position sensor; and
  an actuation rod connected to the gear box for rotating the plurality of fog barriers to be tilted to the predetermined angle,
  wherein, when a wind pressure according to the wind velocity sensed by the wind velocity sensor exceeds a predetermined pressure, the gear box is operated in the forward position so that the actuation rod rotates the plurality of fog barriers to be tilted to the predetermined angle;
  wherein the gear box is operated in the neutral position in a state in which the plurality of fog barriers are tilted at the predetermined angle;

wherein, when the wind pressure according to the wind velocity sensed by the wind velocity sensor is below the predetermined pressure, the gear box is operated in the reverse position so that the actuation rod rotates the plurality of fog barriers to an original fixed position; and wherein the gear box is operated in the neutral position after the plurality of fog barriers are returned to the original fixed position.

16. The multipurpose fog removal system of claim 9, wherein the wind prevention apparatus comprises:
a cross bar rotatably supported on sides of the fog barrier support;
a damper fixed to one side of the fog barrier support;
a first actuation rod having one end fixed to the frame of the plurality of fog barriers;
a weight body having one end fixed to another end of the first actuation rod, wherein another end of the weight body is configured as a free end;
a second actuation rod having two actuation rods, wherein one end of the one actuation rod of the second actuation rod is fixed to the cross bar, one end of the other actuation rod of the second actuation rod is fixed to the one end of the weight body, and another end of the one actuation rod of the second actuation rod and another end of the other actuation rod of the second actuation rod are rotatably connected together; and
a third actuation rod having two actuation rods, wherein one end of the one actuation rod of the third actuation rod is fixed to the cross bar, one end of the other actuation rod of the third actuation rod is fixed to the damper, and another end of the one actuation rod of the third actuation rod and another end of the other actuation rod of the third actuation rod are rotatably connected together,
wherein the weight of the weight body is set to hold the plurality of fog barriers at a fixed position by the weight of the weight body when a wind pressure applied to the plurality of fog barriers is lower than a predetermined pressure, and to rotate the plurality of fog barriers to be tilted to the predetermined angle from the fixed position when the wind pressure applied to the plurality of fog barriers is equal to or higher than the predetermined pressure.

17. The multipurpose fog removal system of claim 9, wherein the wind prevention apparatus comprises:
a spring having one end fixed at a lower end of the fog barrier support, is tensioned when a tensile force applied to the spring is higher than a predetermined pressure;
a wire having one end connected to another end of the spring, and another end fixed near the upper part of the frame of the plurality of fog barriers; wherein, when a wind pressure applied to the plurality of fog barriers is more than the predetermined pressure, the plurality of fog barriers are rotated to be tilted to the predetermined angle from a fixed position, and the wire moves along the frame of the plurality of fog barriers to apply the tensile force to the spring; and wherein, when the wind pressure applied to the plurality of fog barriers is less than the predetermined pressure, the wire pulls the plurality of fog barriers by the restoring compressive force of the spring to the fixed position;

a damper installed in contact with the frame of the plurality of fog barriers;
a damper mount for securing the damper to the fog barrier support;
wherein, when the wind pressure applied to the plurality of fog barriers is less than the predetermined pressure, the plurality of fog barriers return to the fixed position by the restoring compressive force of the spring, and the damper mitigates any shock of the plurality of fog barriers; and
a stopper fixed to the damper;
wherein, when the plurality of fog barriers return to the fixed position by the restoring compression force of the spring, the stopper contacts the frame of the plurality of fog barriers to maintain the plurality of fog barriers at the fixed position.

18. The multipurpose fog removal system of claim 17, wherein the wind prevention apparatus further comprises:
a roller fixed to a roller mount which is attached to the fog barrier support; and
a contact member having one end connected to the damper through the damper mount, and another end contacting the frame of the plurality of fog barriers;
wherein the wire is wound around the roller to operate smoothly in response to tension and compression forces of the spring; and wherein the another end of the contact member contacting the frame of the plurality of fog barriers is rounded.

19. The multipurpose fog removal system of claim 9, wherein the multipurpose fog removal system further comprises:
an automatic control panel configured to receive a fog sensing signal, an A image output signal, and wind direction/velocity signals provided from a fog sensing device, CCTV, and a wind sensing device, respectively, and configured to receive temperature/humidity signals provided from temperature/humidity measurement sensors and a tilt signal of the plurality of fog barriers provided from a position sensor for sensing the tilt of the plurality of fog barriers;
wherein the automatic control panel includes a programmable logic controller (PLC) and a communication card for Ethernet communication; and
wherein the heating means for heating and drying the coated mesh and the super absorbent sheet, the overflow prevention apparatus, and the wind prevention apparatus are controlled manually by operators in a central control regulating station or automatically based on data and the signals, wherein the data and the signals are received by a data receiving set of the central control regulating station via the automatic control panel.

20. The multipurpose fog removal system of claim 19, wherein the data and the signals received by the automatic control panel are provided to a portable terminal of an operator outside the central control regulating station via wireless communication, and
wherein the heating means for heating and drying the coated mesh and the super absorbent sheet, the overflow prevention apparatus, and the wind prevention apparatus are remotely and wireless controlled by the operator.

* * * * *